F. G. WHITTIER.
CENTRAL STATION APPARATUS FOR CARRIER DESPATCH SYSTEMS.
APPLICATION FILED AUG. 7, 1918.
1,365,428. Patented Jan. 11, 1921.
2 SHEETS—SHEET 2.
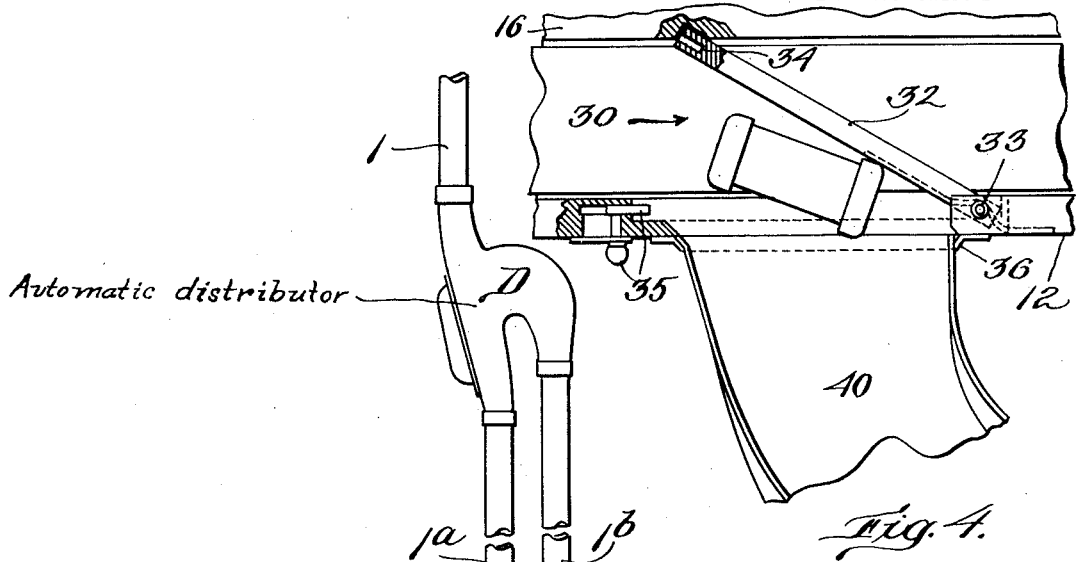
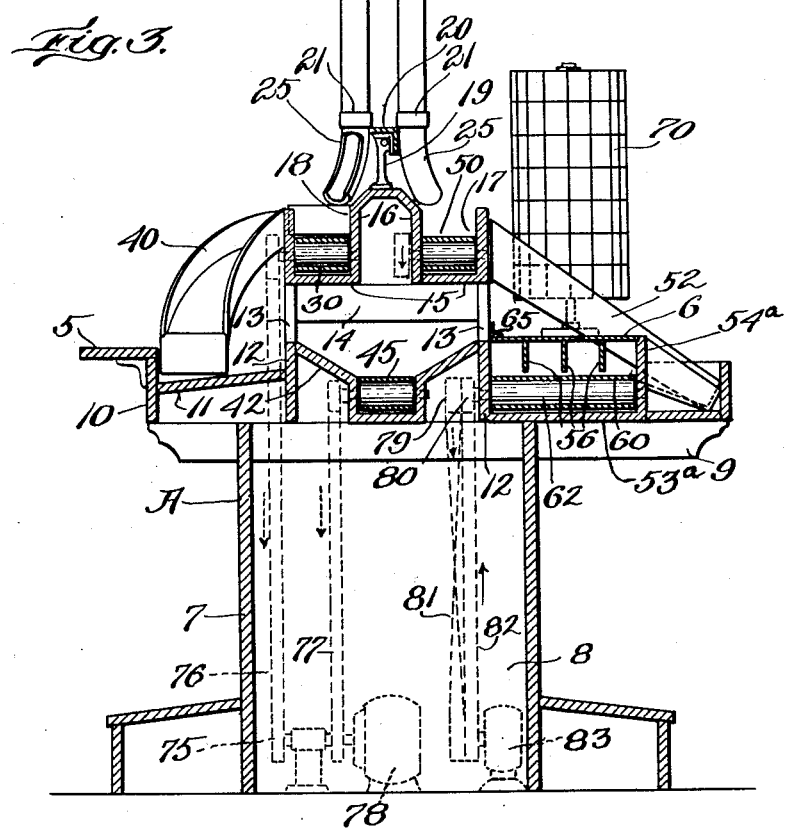

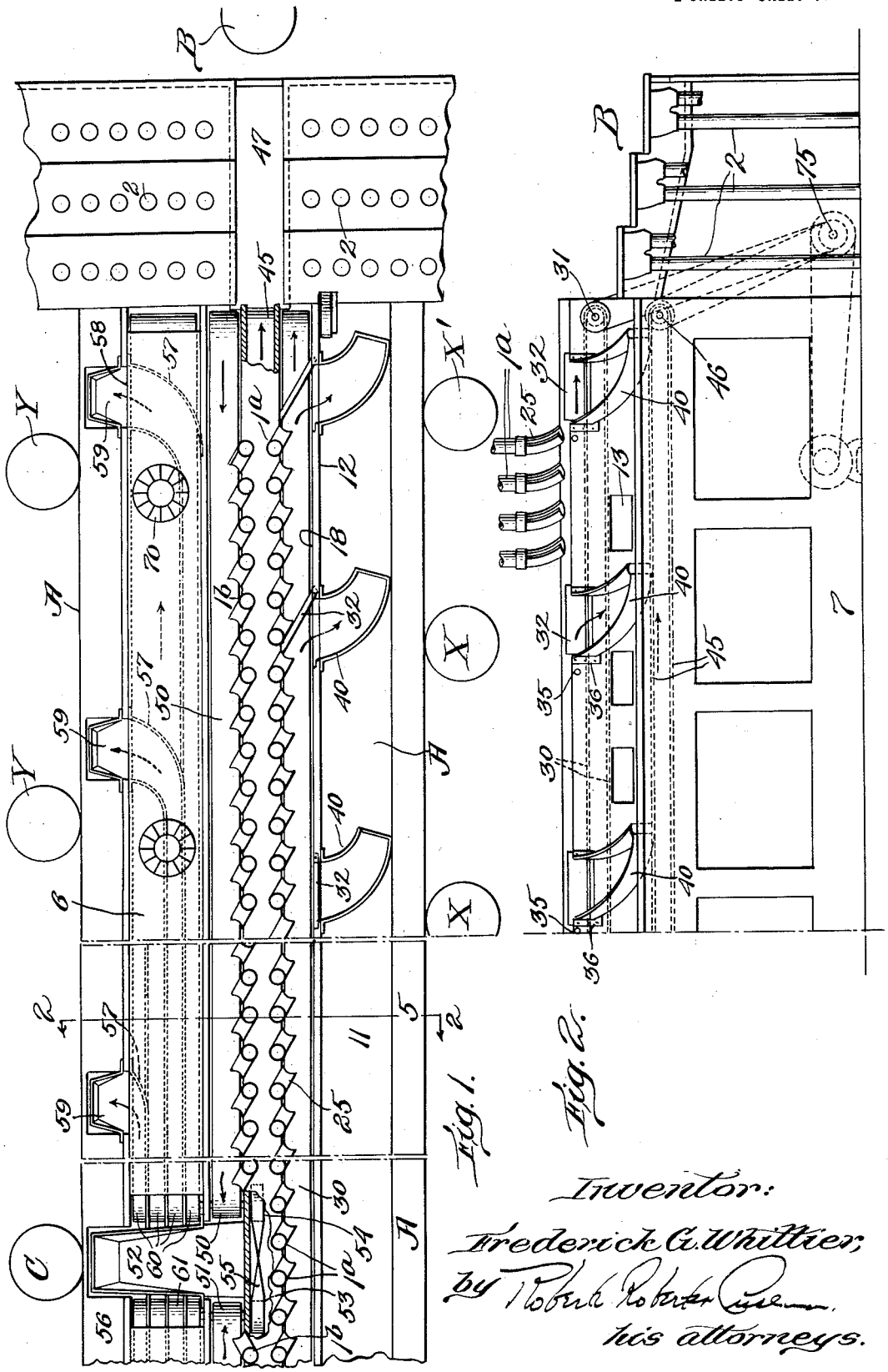

UNITED STATES PATENT OFFICE.

FREDERICK G. WHITTIER, OF IPSWICH, MASSACHUSETTS, ASSIGNOR TO THE LAMSON COMPANY, OF BOSTON, MASSACHUSETTS, A CORPORATION OF NEW JERSEY.

CENTRAL-STATION APPARATUS FOR CARRIER-DESPATH SYSTEMS.

1,365,428.   Specification of Letters Patent.   Patented Jan. 11, 1921.

Application filed August 7, 1918. Serial No. 248,728.

*To all whom it may concern:*

Be it known that I, FREDERICK G. WHITTIER, a citizen of the United States of America, and resident of Ipswich, in the county of Essex and State of Massachusetts, have invented new and useful Improvements in Central-Station Apparatus for Carrier-Despatch Systems, of which the following is a specification.

This invention relates to apparatus adapted to be used in, the receipt, handling, distribution at and despatch from a central office or station of articles, papers, or money; the making of change; the authorization or record, or both, of charge transactions noticed on memoranda received; and in general to the facilitation of such transactions as are desirably centralized in one office of an organization such as a large department store or other establishment requiring the rapid despatch to and from a central point of articles, papers or money, the inspection, exchange or operation upon the thing despatched, and the return to outlying stations of results of this activity.

The invention is therefore applicable to practice with, or ancillary to, a carrier despatch system having a central multiple receiving and despatch station serving a plurality of outlying stations, and will be described for an illustrative instance as applied to improving the economy, speed, accuracy and flexibility of the operations performed at the central cashier's and authorizer's station in a large department store having a number of departments served by incoming and outgoing conveyer lines, preferably pneumatic tubes, converging at the central station; but the instance selected is presented only, in illustration of the genus constituting the invention, which is applicable to many other situations and appliances.

It has heretofore been a practice in such establishments to rely upon a system of conveyers having receiving and sending terminals grouped at a station and served by cashiers, whose duties comprise opening the carrier and making change, or referring a memorandum of the customer's desire to charge to his account the amount of his purchase to clerks known as authorizers, and thereafter despatching back to the sender a carrier containing the change or a token of authorized debit on account. The volume of such transactions in any department or group of departments varies from day to day and from hour to hour, so that it is necessary with such a system to provide more attendants than are able to attend to the average business at a group of such terminals, in order to provide for the occasions when one or more or all groups are excessively busy. When business is light, the arrangement and dimensions of the whole series of incoming and outgoing terminals heretofore made it necessary for more attendants to remain on duty than would have been sufficient to take care, if there were a better and more concentrated distribution, of the same volume of receipts, of action on them, and of despatches in return. This is due to the large number of terminals required, which extend over much space, such as the length of a long table or desk, by reason of which even a moderate business incoming at scattered terminals of the series either requires an attendant to be present at the place of arrival, or demands such agility in moving from one place to another as to make it impossible for a few persons only to attend to this duty.

Loss of time in separating incoming carriers and distributing them to the correct class of attendants has been obviated in part heretofore by the provision of automatic means for distributing incoming carriers of different kinds, for instance by employing pneumatic tubes with split terminals, one branch going to the position of each kind of attendant, such a conveyer having automatically acting distributing means, for instance for delivering one kind of carrier containing money to the cashiers, and another kind containing charge memoranda to the charge authorizers. Distributing means adapted for this purpose is explained in Letters Patent to Albert W. Pearsall, No. 1,102,225, dated June 30, 1914. But as heretofore used, it still is necessary to keep on duty at the central station more attendants than enough to take care of the actual amount of business because the arrivals of carriers of each kind still may be at widely separated places. Service under these conditions involves more loss of time than is desirable whenever less than a full number of attendants is on duty, and effectually prevents use of the idle time at other duties of those attendants held in reserve for the periods of heavy or maximum business, since an attendant must remain in convenient and instant access to fresh arrivals of carriers from any part of the system.

Principal objects of this invention are to obviate loss of time at such central stations, to release a number of operators from attendance in proportion to a diminished volume of transactions, to cause the useful effort of all of the operators, no matter how few of them may be on duty, to be applied with equal advantage and economy of time to all of the outlying stations served by the system, and to lessen opportunity for mistaken despatches of returned carriers. Other objects are to provide suitable apparatus and mechanism to aid in reaching these results, and to provide a carrier despatch system with central station devices adapted to move incoming and outgoing carriers from one part to another part of the station without loss of time, for a desirable distribution of carriers, and to provide an improved arrangement of receiving and despatch terminals.

For the above and other objects, the present apparatus facilitates the practice of the art or method which comprises handling the carriers and their contents by a series of distributing and other operations or steps performed upon the carriers received, within the central station proper, for the purpose of enabling a minimum number of operators to attend to the action demanded by the contents of the carriers, and then return the carriers to their point of origin without any loss of time due to failure of a carrier to reach the proper operator speedily, and without demanding impractical or time-consuming movements of an operator having to do with either the receipt or despatch of carriers, as distinguished from action on their contents. This series of steps is so contrived as to be adaptable with equal economy of time to all conditions of activity of the business served, and is further so contrived as to permit increasing or decreasing activity to be met by employing and releasing respectively the additional operators called upon to handle increasing volume of business, without confusion.

The new apparatus for aid in practising the method provides a genus of devices for distributing and moving from place to place at the will of the operators, within the central station proper, the carriers arriving at and departing from the station, in relation to an improved arrangement of receiving and sending terminals for a series of carrier despatch lines.

In the accompanying drawings,—

Figure 1 is a plan view, portions being broken away, of a central station at which the new method is adapted to be practised with the aid of the devices forming another part of said invention;

Fig. 2 is a side elevation;

Fig. 3 is a transverse section on the line 2—2 of Fig. 1; and

Fig. 4 is a detail plan view on a larger scale of one of the deflecting gates and a cashier's chute.

The carrier despatch system selected for illustration comprises a series of incoming and outgoing pneumatic tubes 1 and 2 respectively. Contrary to the usual practice, the incoming tubes 1 are associated together and the outgoing tubes 2 are associated together, each in a single orderly arranged bank. A certain tube 2 at the central station herein illustrated is therefore adapted to deliver carriers to at least one station from which a certain tube 1 receives carriers.

In the preferred arrangement illustrated, the incoming tubes 1 are concentrated in a series along the central axis of a table or desk referred to in general at A and comprising upper working surfaces 5 and 6 respectively adapted to the use of cashiers and charge authorizers, the surfaces or ledges 5 and 6 preferably being at opposite sides of the structure A. The desk A may be as wide and as long as necessary to accommodate the number of terminals desired. As shown a convenient structure comprises spaced side walls 7 inclosing between them a compartment 8 housing operating mechanism hereinafter mentioned, connected at the top by struts 9 adapted to support the cashier's ledge or table comprising an upright board 10, a board constituting the ledge 5, and a board 11 defining a relatively shallow depression along the cashier's side of the desk A. The central part of the desk is divided off by upright partitions 12, having windows 13. These partitions 12, which rest upon the struts 9 may be held together in parallel relation by lateral struts 14 and a top 15 depressed somewhat within the upper limit of the partitions 12, and having thereon a central partition which may be a five-sided downwardly opening box 16, so as to provide longitudinal troughs 17, 18, running the length of the desk A.

On top of the partition 16 on suitable brackets 19 a rail 20 is provided to support the collars 21 adapted to hold the tubes 1$^a$ and 1$^b$. Beneath the collars 21 these tubes terminate in some form of effective momentum-absorbing terminal adapted to emit carriers received, for instance the pig's ear or midget terminal 25 illustrated, comprising a short curved section of tube open at the concave side of the curve. In the instance illustrated the tubes 1$^a$ and 1$^b$ are in pairs, constituting splits or divisions of a single incoming tube 1, the entrance of carriers arriving along the tube 1 to tube 1$^a$ or tube 1$^b$ being controlled by the automatic distributing device D, which may correspond to the Letters Patent to Albert W. Pearsall above mentioned, and need not be described in detail. Effectively carriers of one kind arriving along the tube 1 are delivered in the left-hand tube 1ª on the cashier's sides of the desk A, and carriers of another kind arriving along the tube 1 are delivered in the right-hand tube 1ᵇ toward the charge authorizers' sides 6 of desk A.

The outgoing terminals 2 are preferably arranged as illustrated at one end of the desk A near a place B hereinafter referred to as the return clerk's station.

A presure system of pneumatic tube conveyers is illustrated in the drawings for the sake of a concrete instance, but it will be understood that a vacuum system or a combined vacuum and pressure system, or some other form of mechanical conveyer than a pneumatic tube may be employed for the purposes of the invention.

It is a characteristic of the apparatus that the deliveries arriving at the tubes 1ª and 1ᵇ are deliveries to another conveyer, rather than to a stationary part of the desk A in reach of an operator, and that the distribution of the carriers to the operators is subsequently made with the aid of the conveyer so receiving the carriers.

The apparatus so disclosed has been devised in pursuit of means for efficiently practising the method of dealing with the carriers referred to above. This method comprises delivering the carriers to an operator at a fixed station, as by so acting upon all of the carriers arriving at the central station as to move each kind of them in a stream receiving accretions at the terminals toward an ultimate destination, and then interrupting this movement by deflecting carriers to an operator's station for the purpose of there taking out of the stream or series of arriving carriers those desired to be detained for the purpose of being opened and change made, or to be examined by reference to a name index and a charge authorized, or the like. The method may comprise then further acting upon all of the carriers, after the intervening manual operation mentioned has been performed, so as to cause all of them to arrive in reach of the return clerk at station B, for return to the point from which the carriers were originally sent.

The method of acting upon the carriers may be further characterized by concentrating all of one selected series, for instance the carriers carrying memoranda of charge accounts, at the station of a distributer able by inspection to determine which of a number of charge authorizers (each of whom, for instance, may have charge of one section 70 of an alphabetical index) shall perform the search and make an indication for transmission by the carrier authorizing or refusing the entry of the charge and delivery of the goods to the customer at the distant station.

Recurring to the apparatus preferably employed, the distributer occupies a station at C, which may be in the middle of the charge authorizer's side 6 of the desk A. In order to practise the above steps with economy of motion, the delivery terminals 1ª and 1ᵇ are respectively arranged above the longitudinal troughs 18 and 17 in the desk A; their delivery terminals 25 are respectively turned toward the ultimate destination of carriers delivered thereby, and the troughs 18 and 17 are occupied by moving belt conveyers adapted to receive the carriers and to carry them to the station of the operator intended to deal with them. For instance, the tubes 1ª on the cashier's side of the table and their terminals 25 turn to the right, as seen in Fig. 1, throughout the entire length of the desk A. In the trough 18 into which the terminals 25 deliver the carriers a belt conveyer 30 of any usual construction running upon usual rolls is driven by a driven roll 31 so that the upper run moves in the direction of the arrow, to the right.

The partitions 12 at regular intervals have openings in them extending beneath the level of the top run of the belt 30, and in these openings swinging gates 32 (Figs. 1, 2 and 4) are hinged on spring hinges at 33 whereby to be swung diagonally across the belt 30, the ends of the gates 32 taking into a notch 34 in the partition 16. Each of the gates 32 may be fastened in a position flush with the partition 12 by a bolt 35. The outer face of the partition 12 carries at the position of the gates 32 a hanger 36 adapted to receive a lip of a portable chute 40 which may be tapered, curved to the right, and inclined downwardly as shown so as to enable the lower end to rest on the bottom of the trough 10, 11, 12.

When a chute 40 is in position and the corresponding gate 32 is open, a carrier delivered on to the belt 30 anywhere in the length of the desk A to the left of gate 32 is swept from the belt and rolls by gravity down the chute 40 immediately in front of a cashier seated at X. If more than one gate 32 is open that gate farthest to the right receives and delivers at the position corresponding to the cashier those carriers received on tubes having terminals on the run of the belt between two open gates, and in that case the gate 32 farthest to the left receives all of the carriers delivered elsewhere on desk A.

It will be observed that if business is light and scattered one cashier at the station X' upon opening her gate 32, all of the others being closed, may receive every carrier delivered by any tube 1ª. When business increases another cashier may be called to take half the desk. This operator opens a gate in front of a position in the length of the table of the desk A, and begins to receive all of the carriers delivered to the left of the seat X she has chosen.

When one of the cashiers has received a carrier, opened it, made change, and placed the change in the carrier, the present invention contemplates that her duty shall have ended, except for throwing the carrier through the nearest window 13, where it is received upon inclined partitions 42 and rolls upon a belt conveyer 45 delivering at the station B of the return clerk. The conveyer 45 may be of any usual or desired construction and may be driven by a driven roll 46 (Fig. 2) the top run moving to the right, as illustrated by the dotted arrow in said figure. At the station B the deliveries of the belt conveyer 45 may be received in an inclined chute 47 in front of the operator at station B. This operator has no other duty than to observe the mark on the carrier indicating the station of its origin, and to insert the carrier in the proper sending terminal 2 in easy reach. Experience shows that this service may be performed so rapidly as to keep up with the total receipts of the largest systems in use.

The tubes 1$^b$ on the charge authorizer's side of the desk A have their terminals 25 turned respectively toward the middle, and deliver over the trough 17 in which belt conveyers 50, 51, respectively run toward the middle of the desk A, to deliver receipts of carriers upon said conveyers to an inclined chute 52 in which the carriers received are conveniently reached by the distributer at station C. The belt conveyers 50, 51, may be carried upon rollers as usual and driven in opposite directions by any convenient means, such as a driven roll (not shown) operated by an electric motor and belt at the left hand end of desk A. Preferably the rolls at the delivery ends are connected by pulleys 53 and 54 and crossed belt 55, so that belt 51 drives belt 50.

The distributer having examined a received carrier, the carrier may be delivered to the charge authorizer (or like operator) in charge of that section of the alphabet to which the name in the carrier belongs. Convenient means for accomplishing this, as shown, may comprise belt conveyers 60 and 61 on rolls 62 respectively running away from the station C at their top runs. Preferably these are wide belts, as shown, running above the floor 53$^a$ of the side 6 of the desk A in the space defined between a vertical longitudinal partition 54$^a$ and partition 12. Hinged to the partition 12 at 65 the surface 6 proper, which may be a metal plate, may rest upon the partition 54$^a$ in its closed position, and carry fixed to its under side a series of vertical separators 56, each in succession curved outwardly as at 57, Fig. 1, to deliver through an opening 58 into a pocket 59 at the station Y of one of the charge authorizers. When the authorizer has finished her work on the contents of a carrier, she throws the carrier through the nearest window 13 for conveyance by belt 45 to the return clerk at B.

The distributer at C, in the instance shown, has in the conveyers 60, 61, and the separators 56, provision for dividing the carriers received into eight different series representing divisions of the alphabet, and for delivering each of these to a different authorizer. More or fewer partitions 56 may be provided to accomplish a different division and distribution as desired.

Any suitable driving arrangement for the driven rolls 31, 46 and 62 may be employed, but preferably a conveniently arranged countershaft 75 and pulleys thereon belted at 76 and 77 respectively to pulleys fast to the driven rollers 31 and 46 is housed in space 8, and operated by an electric motor 78. Pulleys 79 and 80 fast to the axes of rolls 62 may respectively be driven by cross belt 81 and straight belt 82 from pulleys on the armature shaft of a separate motor 83.

I claim:

1. The combination in a carrier despatch system of a series of receiving terminals, a series of corresponding despatch terminals assembled together, means adapted to receive and transport carriers delivered from any of said receiving terminals in a predetermined direction, means for deflecting carriers from said means at one or more places, and means for despatching carriers from said place or places to the place of the despatch terminals.

2. A central station for carrier despatch systems having therein a series of carrier receiving terminals and a separate bank of carrier despatch terminals for conveyer lines returning to the respective points of origin of the received carriers, and means for conveying carriers from points near the receiving terminals to a point near said despatch terminals, whereby returned carriers may be despatched by an operator occupying a fixed station at the despatch terminals.

3. A central station for carrier despatch systems having therein a series of carrier receiving terminals each adapted to deliver incoming carriers, means to receive the carriers and move them in a stream along the series of terminals, and means adjustable to deflect or not to deflect said stream from said means at the station of an operator.

4. A central station for carrier despatch systems having therein at one place a series of carrier receiving terminals and at another place a bank of carrier despatch terminals connected severally to the points of origin of the despatch lines ending at said receiving terminals, and means for moving carriers along the position of the series of receiving terminals toward the position of the bank of despatch terminals.

5. A central station for carrier despatch systems having therein a bank of carrier receiving terminals, a conveyer adapted to receive and transport carriers delivered by any of said terminals, and a plurality of movable means distributed along the length of the conveyer each adapted in one position to deflect from the conveyer all of the carriers brought by the conveyer to the place of deflection.

6. A central station for carrier despatch systems having therein a bank of carrier receiving terminals, a bank of carrier despatch terminals, and a plurality of conveyers running along the bank of receiving terminals, one of said conveyers being adapted to move arriving carriers to the station of an operator, and another of said conveyers being adapted to move a carrier delivered to it by an operator to a place near to the despatch terminals.

7. A central station for carrier despatch systems having therein a plurality of series of receiving terminals of carrier despatch lines, means coöperating with the receiving terminals to distribute carriers of different kinds to the respective series, and convergent conveyer means adapted to receive and automatically convey all of the carriers of one kind after receipt to a fixed station for manual distribution in accordance with their contents.

8. A central station for carrier despatch systems having therein a plurality of series of receiving terminals of carrier despatch lines, means coöperating with the receiving terminals to distribute carriers of different kinds to the respective series, means adapted to convey all of the carriers of one kind after receipt to a fixed station for manual distribution in accordance with their contents, and conveyer means for delivering the distributed carriers at any of a plurality of stations of operators.

9. A central station for carrier despatch systems having therein a desk, series of receiving terminals at respective sides of the desk, automatic means for distributing arriving carriers of different kinds to the terminals at respective sides of the desk, a series of despatch terminals at one end of the desk, and conveying means running along the desk and accessible to operators at each side thereof for sending carriers to be returned to an operator at the despatch terminals.

10. A central station for carrier despatch systems, having therein means for delivering to an operator's station carriers arriving at any of a plurality of carrier receiving terminals of the system, and conveyer means severally delivering carriers distributed by said operator to any of a plurality of other operators at different stations.

11. In a carrier despatch system in combination with the receiving terminals of the system a conveyer for distributing carriers to different stations comprising a moving belt, and means for deflecting carriers placed in different positions on the belt, adapted to receive carriers from said terminals off the belt at different places along its run.

12. In a carrier despatch system, a conveyer for distributing carriers to different stations comprising a relatively broad belt, a cover spaced therefrom, and a series of guides fixed on the cover and running lengthwise thereof for guiding carriers placed on the belt in different lateral positions with respect to the belt, said guides terminating in portions bending away from the belt laterally thereof at the different stations.

13. In a carrier despatch system, the combination with incoming and outgoing carrier conveyer lines having outlying stations and receiving and despatching terminals respectively arranged in separate banks at a central station, of a desk associated with the bank of incoming terminals, means for automatically delivering carriers of different kinds at different sides of the desk, conveyer and means for operating it on said desk for automatically carrying carriers of one kind received to the fixed station of an operator, and a conveyer delivering toward the bank of despatch terminals adapted to receive carriers placed upon it by said operator.

Signed by me at Boston, Massachusetts, this first day of August, 1918.

FREDERICK G. WHITTIER.

It is hereby certified that in Letters Patent No. 1,365,428, granted January 11, 1921, upon the application of Frederick G. Whittier, of Ipswich, Massachusetts, for an improvement in "Central-Station Apparatus for Carrier-Despatch Systems," errors appear in the printed specification requiring correction as follows: Page 5, line 76, claim 11, after the word "belt" insert the words *adapted to receive carriers from said terminals;* lines 77–78, strike out the words "adapted to receive carriers from said terminals;" same page, line 99, claim 13, after the word "desk" insert the article *a;* and that the said Letters Patent should be read with these corrections therein that the same may conform to the record of the case in the Patent Office.

Signed and sealed this 20th day of January, A. D., 1921.

[SEAL.]

L. B. MANN,
*Acting Commissioner of Patents.*

Cl. 243—16.